United States Patent
Farley

(10) Patent No.: US 8,002,069 B2
(45) Date of Patent: Aug. 23, 2011

(54) WORK MACHINE INCLUDING HYDROSTATIC GROUND DRIVE WHICH AUTOMATICALLY PROVIDES INCREASED PROPULSION TORQUE WHEN THE MECHANICAL TRANSMISSION IS IN A HIGH GEAR

(75) Inventor: Herbert M. Farley, Elizabethtown, PA (US)

(73) Assignee: CNH America LLC, New Holland, PA (US)

( * ) Notice: Subject to any disclaimer, the term of this patent is extended or adjusted under 35 U.S.C. 154(b) by 143 days.

(21) Appl. No.: 12/620,040

(22) Filed: Nov. 17, 2009

(65) Prior Publication Data

US 2011/0114408 A1    May 19, 2011

(51) Int. Cl.
*B60K 17/356* (2006.01)
(52) U.S. Cl. .......... 180/242; 180/243; 180/305
(58) Field of Classification Search ........ 180/242, 180/243, 305, 307, 308, 423, 441
See application file for complete search history.

(56) References Cited

U.S. PATENT DOCUMENTS

| | | | |
|---|---|---|---|
| 3,584,698 A * | 6/1971 | Larson et al. | 180/14.3 |
| 3,736,732 A | 6/1973 | Jennings et al. | |
| 3,780,820 A * | 12/1973 | Schwab et al. | 180/243 |
| 3,841,423 A | 10/1974 | Holtkamp et al. | |
| 3,918,546 A * | 11/1975 | Chichester et al. | 180/243 |
| 3,984,978 A | 10/1976 | Alderson | |
| 4,072,009 A | 2/1978 | Daschievici et al. | |
| 4,140,196 A | 2/1979 | Brewer | |
| 4,244,184 A | 1/1981 | Baldauf et al. | |
| 4,295,539 A | 10/1981 | Beck et al. | |
| 4,396,087 A | 8/1983 | Rock et al. | |
| 4,480,502 A | 11/1984 | Nembach | |
| 4,635,743 A | 1/1987 | Riehl | |
| 4,696,367 A | 9/1987 | Delfs | |
| 4,766,727 A | 8/1988 | Dull et al. | |
| 5,647,211 A * | 7/1997 | Harber et al. | 60/484 |
| 5,810,106 A * | 9/1998 | McCoy | 180/243 |
| 5,946,910 A | 9/1999 | Hayashi et al. | |
| 7,059,442 B2 | 6/2006 | Wilks et al. | |

* cited by examiner

*Primary Examiner* — Paul N Dickson
*Assistant Examiner* — Tashiana Adams
(74) *Attorney, Agent, or Firm* — Michael G. Harms; Patrick M. Sheldrake

(57) ABSTRACT

A work machine having a mechanical transmission in combination with a hydrostatic ground drive including a primary drive and a secondary drive engageable for providing additional propulsion torque in a power assist mode, the hydrostatic drive automatically providing an increased torque capability when the transmission is engaged in a high speed range, thereby allowing the work machine to accelerate from a complete stop to a high speed range with the transmission in a high speed range without the need to stop to shift the mechanical transmission to accommodate an increased propulsion torque requirement.

20 Claims, 8 Drawing Sheets

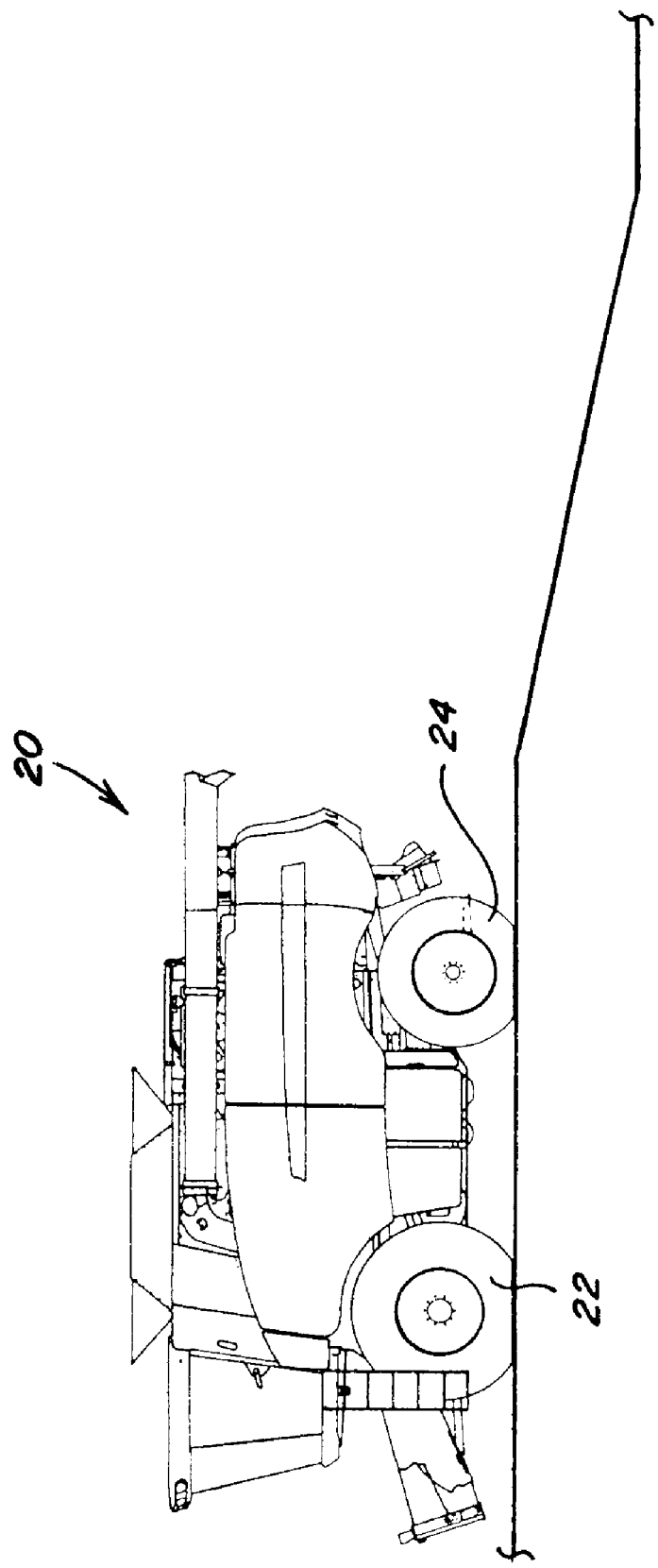

WORK MACHINE INCLUDING HYDROSTATIC GROUND DRIVE WHICH AUTOMATICALLY PROVIDES INCREASED PROPULSION TORQUE WHEN THE MECHANICAL TRANSMISSION IS IN A HIGH GEAR

TECHNICAL FIELD

This invention relates generally to a work machine having a hydrostatic ground drive and a clutchless mechanical transmission, and more particularly, to providing increased propulsion torque availability when the transmission is in a high gear thereby allowing the work machine to accelerate from a complete stop with the transmission engaged in a high speed range without downshifting to meet an increased propulsion torque requirement.

BACKGROUND ART

It is well known to provide hydrostatic ground drives for work machines such as agricultural combines and the like. Such drives typically include one or more fluid pumps operable for supplying a flow of pressurized fluid to a primary drive including at least one fluid motor for operating a set of primary movers, typically the front movers, of the machine. Additionally, it is known to provide such drives in combination with multiple speed mechanical transmissions in driven relation to the at least one fluid motor and connected in driving relation directly with the primary movers. These clutchless transmission systems require the work machine to come to a complete stop prior to shifting between speed ranges. The multiple speed ranges or gears of the mechanical transmission include at least one low speed range suitable for performing work functions in a field and at least one high speed range suitable for travel over public roads. In addition, when the transmission is engaged in a low speed range and the machine is experiencing high propulsion torque requirements, a power assist mode may be engaged to divert a portion of the flow of pressurized fluid to a secondary drive including one or more fluid motors in driving relation to a set of secondary movers, typically the rear movers, of the machine. In other words, additional propulsion torque is provided by the secondary movers when a portion of the flow of pressurized fluid is divided between the primary fluid drive and the secondary fluid drive. For example, the power assist mode is typically employed to provide additional torque from the rear axle drive of a combine in muddy conditions during field operations and for improved steering on side hills.

Problems and shortcomings of work machines having clutchless mechanical transmission systems in combination with presently known hydrostatic ground drives include the inability to provide additional propulsion torque when the transmission is engaged in a high speed range. For example, when the work machine is performing an operation in which it will be driven at high speed, the transmission is necessarily engaged in a high speed range. However, if the machine encounters muddy or hilly conditions during the operation, the propulsion torque required by these conditions may exceed the propulsion torque available from the primary drive alone, resulting in extremely poor operating efficiency, excessive hydraulic fluid heat, hydraulic component wear, slow acceleration, or even stalling. In this situation, the machine must be stopped, and the mechanical transmission shifted into a low speed range so the power assist mode can engage to provide additional propulsion torque from the secondary drive. Once out of the mud or at the crest of the hill, the machine must again be stopped and the mechanical transmission shifted into a high speed range to continue the high speed operation.

Another example in which these problems and shortcomings have been observed is in connection with transporting a work machine over the road. When climbing out of a field, the work machine experiences a high propulsion torque requirement, a situation in which additional propulsion torque from the secondary drive may be required, so the transmission must be engaged in a low speed range. When traveling over the road, however, the transmission is preferably engaged in a high speed range in order for the work machine to reach road speeds. Using presently known systems, the work machine must pull out of the field onto the road with the transmission in a low speed range so additional propulsion torque is available from then secondary drive to propel the machine up the hill. Once on the road, the machine must come to a complete stop in order to shift the transmission into a high speed range for traveling at road speeds.

It would be advantageous for the work machine to have additional propulsion torque to be able to pull out of the field onto the road and accelerate to road speeds without the need to stop on the road to shift the transmission from a low gear to a high gear. Using presently known systems, however, the choices include driving at road speeds with the transmission in a low speed range which causes excessive hydraulic system wear, or climbing out of the field with the transmission in a high speed range and risk experiencing propulsion torque requirements that can not be met by the primary drive.

What is sought therefore is a work machine having a clutchless mechanical transmission in combination with a hydrostatic ground drive which automatically provides increased propulsion torque availability when the transmission is engaged in a high speed range, and which overcomes one or more of the problems and shortcomings set forth above.

SUMMARY OF THE INVENTION

What is disclosed is a work machine having a clutchless mechanical transmission in combination with a hydrostatic ground drive which automatically provides increased propulsion torque availability when the transmission is engaged in a high speed range, and which overcomes one or more of the problems and shortcomings set forth above.

According to the present invention, the work machine includes a set of primary movers which support a portion of the machine and are operable for propelling the machine over the ground at a ground speed. A set of secondary movers which support another portion of the machine and are operable by at least one secondary fluid motor connected in driving relation thereto for driving the secondary movers assist the primary movers. A mechanical transmission, connected in driving relation directly to the set of primary movers, is selectably engageable in a plurality of speed ranges, and is configured and operable for transitioning between the ranges only at a zero ground speed. In particular, the plurality of speed ranges include at least one road speed range for propelling the work machine between the zero ground speed and a predetermined high ground speed suitable for travel over public roads, and at least one low speed range within the road speed range for propelling the work machine between the zero ground speed and a predetermined low ground speed suitable for performing work functions in agricultural fields and slower than the predetermined high ground speed. The work machine also includes a hydrostatic drive including a pump connected in a fluid loop with a primary fluid motor.

The drive is operable for directing a flow of pressurized fluid through the loop at a fluid pressure to the primary fluid motor for controllably driving the primary fluid motor which is connected in driving relation to the mechanical transmission. A valve, connected to the fluid loop and to the at least one secondary fluid motor, is selectably operable in a power assist mode for diverting a portion of the flow of fluid in the loop to the at least one secondary motor for controllably driving the at least one secondary fluid motor. The work machine also includes a controller which is connected in operative control of the valve, and is configured and operable for monitoring the speed range of the transmission, the fluid pressure in the loop, and the ground speed of the machine. The controller is programmed for automatically operating the valve in the power assist mode when the transmission is engaged in the at least one road speed range and the ground speed below a predetermined transition speed slower than the predetermined high ground speed.

According to a preferred aspect of the invention, the controller is preferably programmed for smooth transitions when engaging or disengaging the power assist mode by operating the valve to produce gradual changes in the fluid pressure in the loop.

As another preferred aspect of the invention, the mechanical transmission provides four forward speed ranges. A low or first speed range between the zero ground speed and a predetermined first ground speed suitable for performing work or harvesting functions in the field. A high or fourth speed range between the zero ground speed and a predetermined fourth ground speed suitable for travel between fields or on public roads. A second and third speed range between the zero ground speed and a predetermined second and third ground speed, respectively, are midranges between the low and high speed ranges. According to this aspect, the controller is programmed for automatically operating the valve in the power assist mode when the mechanical transmission is engaged in the third or fourth speed range and the ground speed is below the predetermined transition speed slower then the predetermined third ground speed.

According to a feature of the invention, the power assist mode includes a first sub mode for diverting a first portion of the flow of fluid in the loop from the primary motor to the at least one secondary motor and a second sub mode for diverting a second smaller portion of the flow of fluid in the loop from the primary motor to the at least one secondary motor. When the transmission is in the road speed, or the high speed range, the controller is further programmed for automatically operating the valve in the first sub mode when the ground speed is below a predetermined first transition speed and operating the valve in the second sub mode when the ground speed is between the predetermined first transition speed and a predetermined second, higher transition speed.

According to another preferred aspect of the invention, the controller is further programmed for automatically operating the valve in the power assist mode when the mechanical transmission is engaged in the at least one road speed range and the fluid pressure exceeds a predetermined maximum fluid pressure and remains greater than a predetermined lower, transition fluid pressure. Similarly, the controller is further programmed for automatically operating the valve in the second sub mode when the transmission is engaged in the at least one road speed range and the fluid pressure exceeds a predetermined second maximum fluid pressure and remains greater than a second predetermined transition fluid pressure lower than the second maximum fluid pressure and operating the valve in the first sub mode when the transmission is engaged in the at least one road speed range and the fluid pressure exceeds a first maximum pressure higher than the second maximum pressure and remains greater than a predetermined first transition fluid pressure.

According to another feature of the invention, the higher speed ranges include the lower speed ranges, and the transition speeds are typically within the lower speed ranges. For example, when the road speed range is from zero to twenty miles per hour, the low speed range is from zero to five or ten miles per hour, and the transition speed is about five miles per hour. As another, non-limiting example, when the first ground speed range is from zero to five miles per hour, the second speed range is from zero to ten miles per hour, the third speed range is from zero to fifteen miles per hour, and the fourth speed range is from zero to twenty miles per hour, the transition speed is about five miles per hour. Also, when operating in the power assist sub modes, exemplary speed for the first transition speed and the second transition speed are five and ten miles per hour, respectively.

BRIEF DESCRIPTION OF THE DRAWINGS

FIG. 10 is a simplified side view of the combine situated for operation on the road at road speeds in a high speed range.

DETAILED DESCRIPTION OF THE INVENTION

Figure 1:
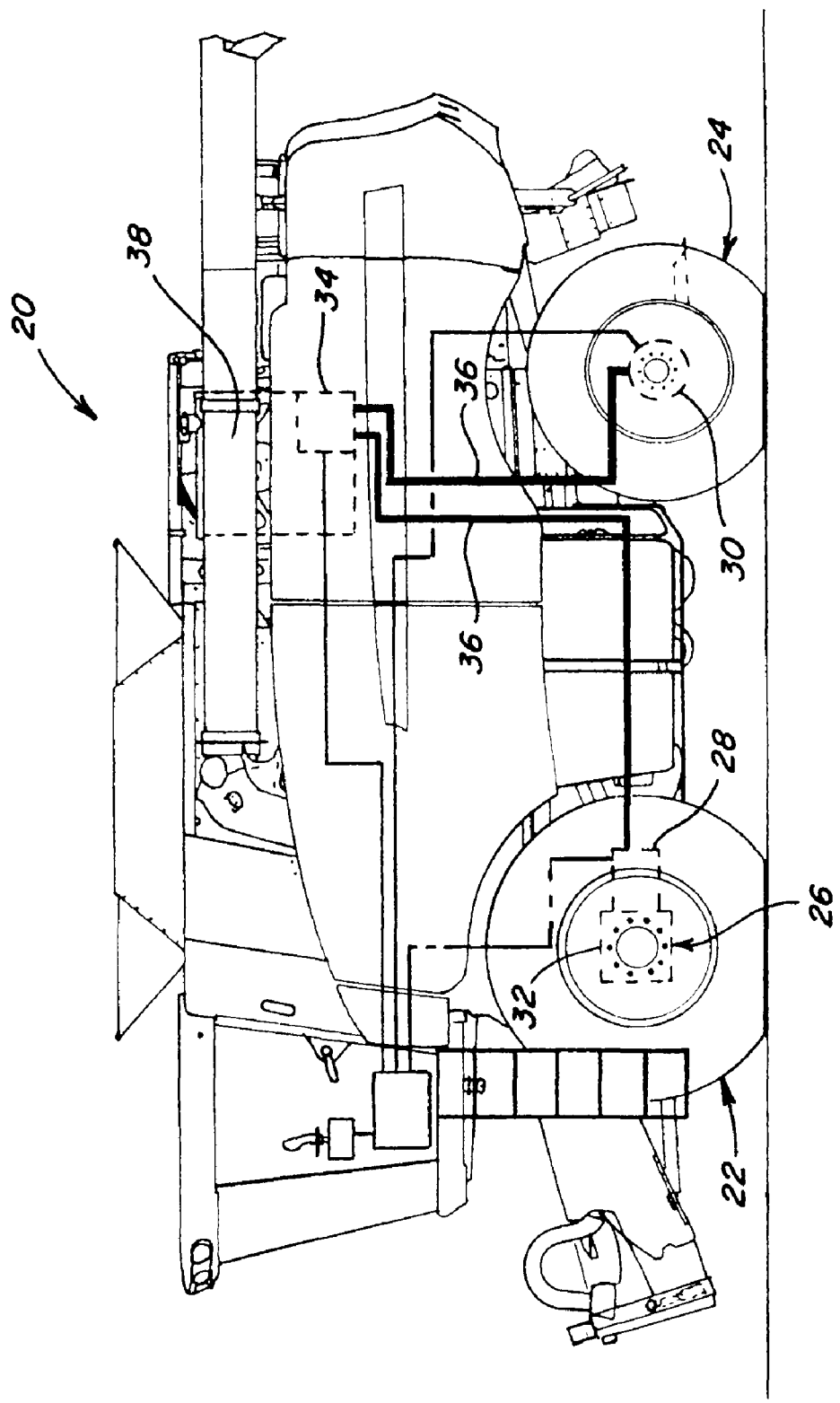
FIG. 1 is a simplified side view of a representative work machine, which is an agricultural combine, including a hydrostatic ground drive having a power assist mode in combination with a mechanical transmission.

Referring to FIG. 1, a representative self-propelled work machine, which is an agricultural combine 20, is shown, including a set of primary movers, represented by front wheels 22, supporting a portion of the machine and a set of secondary movers, represented as a pair of rear wheels 24, supporting another portion of the machine. Front wheels 22 are operable by a primary fluid motor 28 for propelling the machine over the ground, and rear wheels 24 are operable by at least one secondary fluid motor 30 connected in driving relation thereto for assisting front wheels 22 for propelling the machine at a ground speed.

Figure 2:
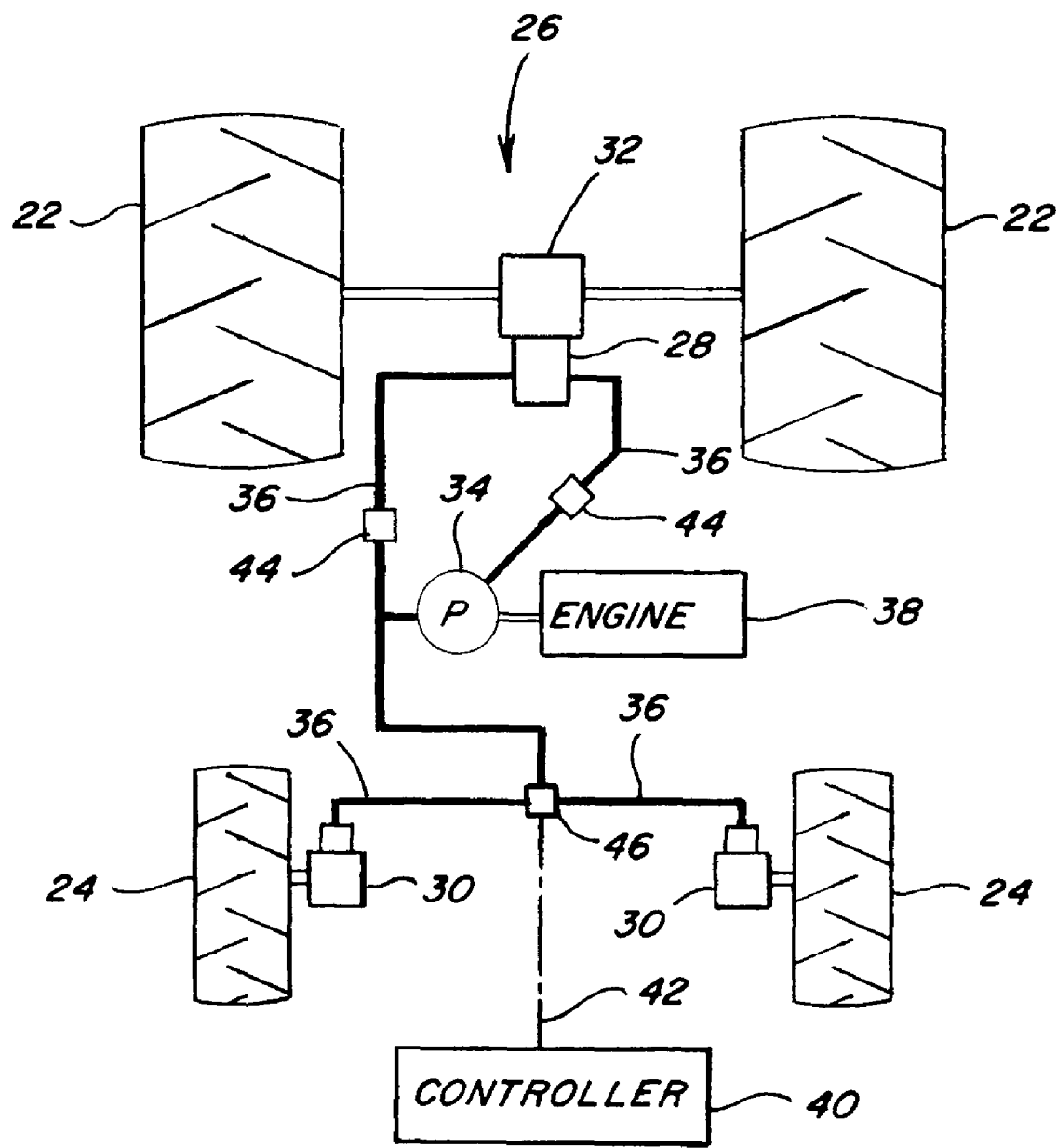
FIG. 2 is a simplified top view of the representative work machine including a schematic of a preferred embodiment of the invention.

Turning also to FIG. 2, a simplified schematic of combine 20 shows a mechanical transmission 32 connected in driven relation to primary fluid motor 28 and in driving relation directly to front wheels 22. Because the combine uses a clutchless system, transmission 32 is configured and operable for shifting between a plurality of speed ranges only when the machine is stationary or at a zero ground speed. Combine 20 includes a hydrostatic drive 26 including a pump 34 connected in a fluid loop, represented by fluid paths 36, with primary fluid motor 28. Hydrostatic drive 26 is operable for directing a flow of pressurized fluid through the loop at a fluid pressure to primary fluid motor 28 for controllably driving primary fluid motor 28. The fluid loop also includes a valve 46 connected to secondary fluid motors 30 which is selectably operable, in a power assist mode, for diverting a portion of the flow of fluid in the loop from primary fluid motor 28 to secondary motors 30 for controllably driving secondary fluid motors 30.

Figure 3:
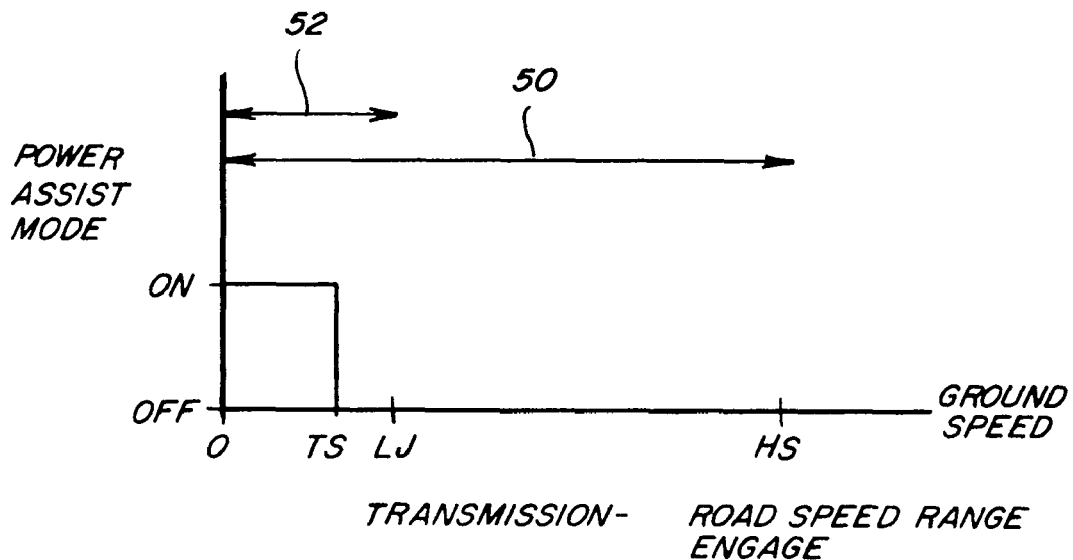
FIG. 3 is a graphical representation of a power assist mode status versus ground speed according to the invention.
Figure 4:
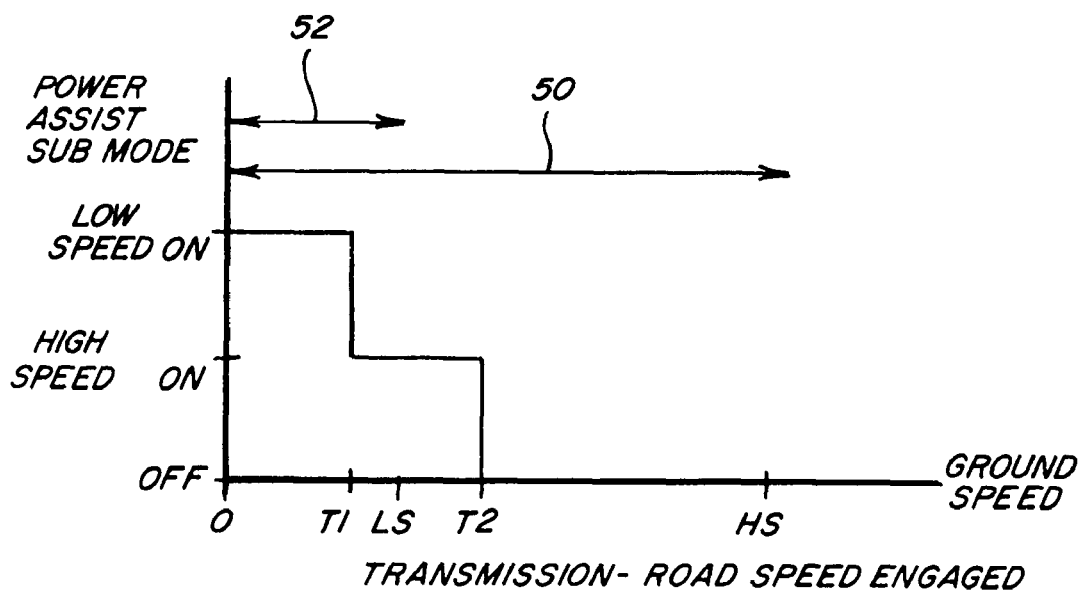
FIG. 4 is a graphical representation of a power assist sub mode status versus ground speed according to the invention.

The speed ranges in which transmission 32 may be selectably engaged are illustrated in FIGS. 3 and 4, and include at least one road speed range 50 for propelling the work machine between a zero ground speed and a predetermined high ground speed HS suitable for travel over public roads, typically at least 15 miles per hour, and at least one low speed range 52 within road speed range 50 for propelling the work machine between the zero ground speed and a predetermined low ground speed LS suitable for performing work functions in agricultural fields, typically less than 10 miles per hour.

As shown in FIG. 2, a controller 40, constructed and operable according to the present invention, is connected in operative control of valve 46 via conductive path 42. Controller 40 is configured and operable for monitoring the speed range of transmission 32 the fluid pressure in the loop, and the ground speed of combine 20. Fluid pressure can be measured with representative pressure sensors 44 and ground speed can be determined by a ground speed sensor (not shown), for example. Further, controller 40 is programmed for automatically operating valve 46 in the power assist mode when transmission 32 is engaged in the at least one road speed range 50 and the ground speed is below a predetermined transition speed TS which is slower than predetermined high ground speed HS as illustrated in FIG. 3. Predetermined transition speed TS is selected to provide additional propulsion torque required for low speed, high torque operations, such as climbing out of a field, when transmission 32 is in road speed range 50. Depending on the application, transition speed TS may be slower than, as shown in FIG. 3, faster than, or equal to predetermined low speed LS.

Figure 5:
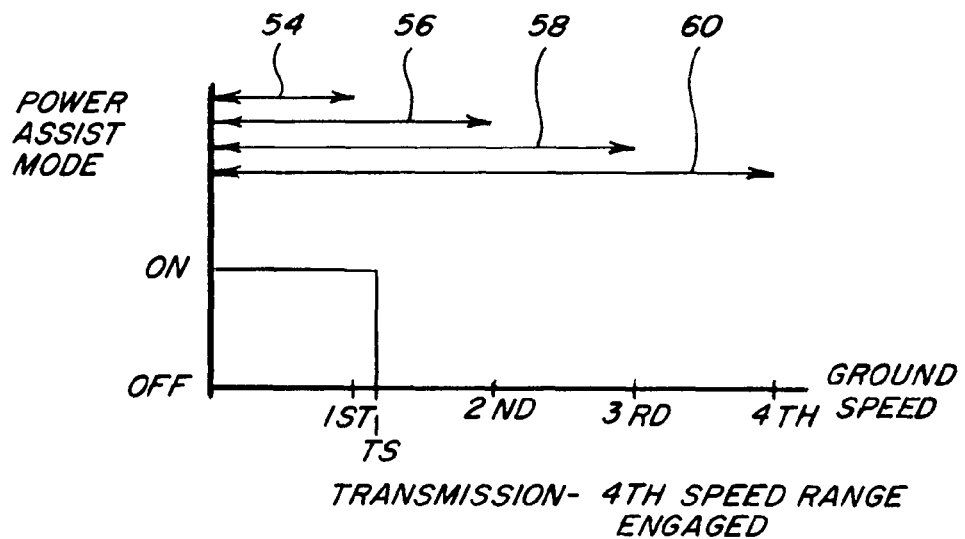
FIG. 5 is another graphical representation of the power assist mode status versus ground speed according to the invention.

FIGS. 4 and 5 illustrate an aspect of the invention wherein the plurality of speed ranges includes a first speed range 54 for propelling the machine between the zero ground speed and a predetermined first ground speed 1ST, a second speed range 56 including first speed range 54 for propelling the machine between the zero ground speed and a predetermined second ground speed 2ND, a third speed range 58 including second speed range 56 for propelling the machine between the zero ground speed and a predetermined third ground speed 3RD, and a fourth speed range 60 including third speed range 58 for propelling the machine between the zero ground speed and a predetermined fourth ground speed 4TH. Controller 40 is programmed for automatically operating valve 46 in the power assist mode when mechanical transmission 32 is engaged in third speed range 58 or fourth speed range 60 and the ground speed is below predetermined transition speed TS which is slower then predetermined third ground speed 3RD as illustrated in FIG. 5. Again transition speed TS is selected to provide additional propulsion torque required for low speed, high torque operations, when transmission 32 is in third speed range 58 or fourth speed range 60. Depending on the application, transition speed TS may be slower, faster, as shown in FIG. 5, or equal to predetermined first ground speed 1ST.

Figure 6:
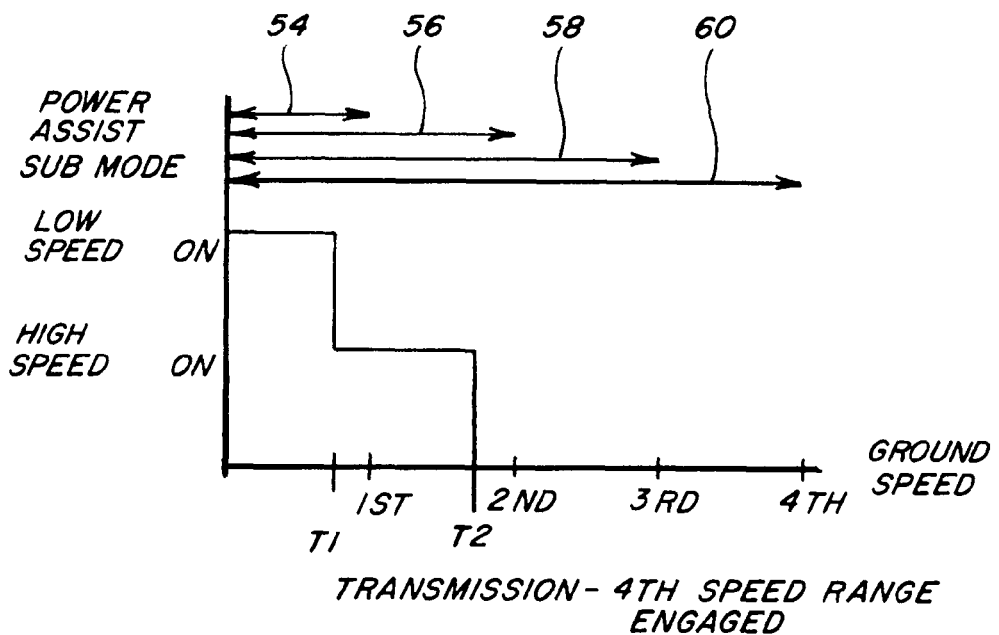
FIG. 6 is another graphical representation of the power assist sub mode status versus ground speed according to the invention.

Turning now to FIGS. 4 and 6 which illustrate another aspect of the invention wherein the power assist mode includes a first sub mode for diverting a first portion of the flow of fluid in the loop from primary motor 28 to secondary motors 30 and a second sub mode for diverting a second smaller portion of the flow of fluid in the loop from primary motor 28 to secondary motors 30. According to this aspect, controller 40 is programmed for automatically operating valve 46 in the first sub mode when transmission 32 is engaged in the at least one road speed range 50 (FIG. 4) (or third speed range 58 or fourth speed range 60 (FIG. 6)) and the ground speed is below a predetermined first transition speed T1. Further controller 40 is programmed for operating valve 46 in the second sub mode when transmission 32 is engaged in the at least one road speed range 50 (FIG. 4) (or third speed range 58 or fourth speed range 60 (FIG. 6)) and the ground speed is between predetermined first transition speed T1 and a predetermined second transition speed T2. Predetermined second transition speed T2 is chosen between predetermined first transition speed T1 and predetermined high ground speed HS (FIG. 4) or predetermined third ground speed range 3RD (FIG. 6). Transition speeds T1 and T2 are selected to provide more additional propulsion torque at very low speeds and less additional propulsion torque as the machine accelerates to road speed. Transition speeds T1 and T2 may be chosen to be slower, faster, or equal to predetermined low speed LS (FIG. 4) or predetermined first or second ground speeds 1ST or 2ND (FIG. 6).

According to another preferred aspect of the invention, controller 40 is further programmed for automatically operating valve 46 in the power assist mode when mechanical transmission 32 is engaged in the at least one road speed range 50 (FIG. 4) (or third speed range 58 or fourth speed range 60 (FIG. 6)) and the fluid pressure exceeds a predetermined maximum fluid pressure and remains greater than a predetermined lower, transition fluid pressure. Similarly controller 40 is further programmed for automatically operating valve 46 in the second sub mode when transmission 32 is engaged in the at least one road speed range 50 (FIG. 4) (or third speed range 58 or fourth speed range 60 (FIG. 6)) and the fluid pressure exceeds a predetermined second maximum fluid pressure and remains greater than a second predetermined transition fluid pressure lower than the second maximum fluid pressure. If engaging the second sub mode does not provide enough additional propulsion torque, controller 40 is programmed for automatically operating valve 46 in the first sub mode when the transmission 32 is engaged in the at least one road speed range 50 (FIG. 4) (or third speed range 58 or fourth speed range 60 (FIG. 6)) and the fluid pressure exceeds a first maximum pressure higher than the second maximum pressure and remains greater than a predetermined first transition fluid pressure.

Operationally, it is important that transition into and out of the power assist mode and sub modes is smooth and seamless. Rapid changes in the flow of fluid in the loop may result in delays or jerky transitions. According to a feature of the invention, controller 40 is programmed for automatically operating valve 46 to produce gradual changes in the fluid pressure in the fluid loop. Controller 40 may use a modulated or ramped command to valve 46, or another suitable method, to avoid abrupt changes of flow in the loop.

Figure 7:
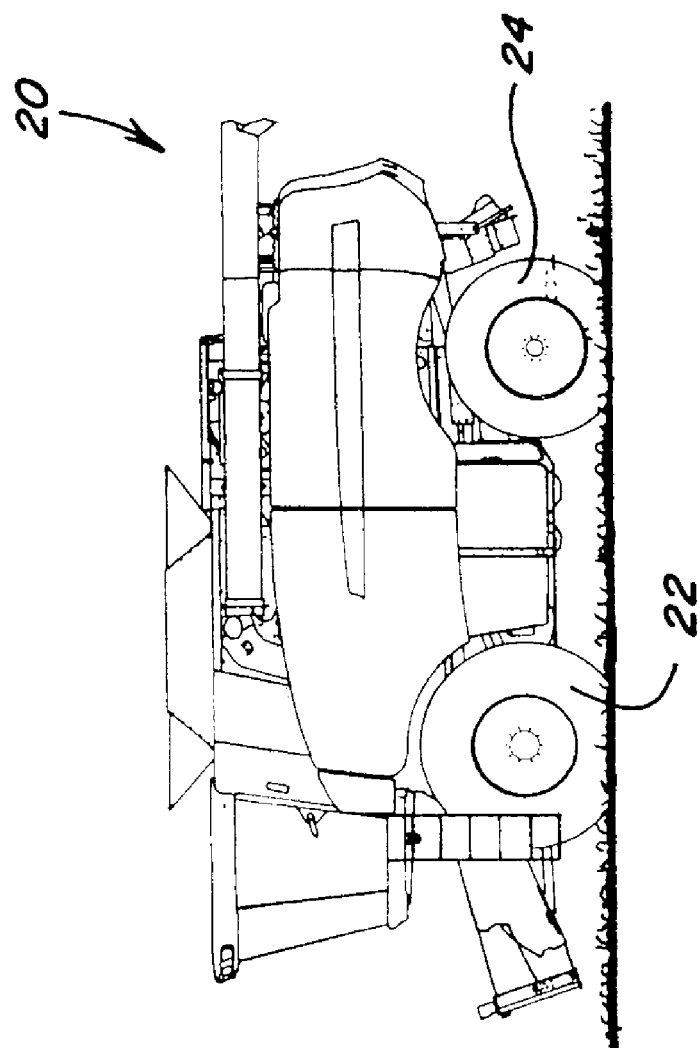
FIG. 7 is a simplified side view of the combine situated for operation in a representative level field.

FIGS. 7-10 will be used to illustrate the important operational aspects of combine 20 when pulling out of a field onto a road. FIG. 7 is depicts combine 20 performing work functions in a field. Ground speeds for this type of operation are typically below five to ten miles per hour and are performed with transmission 32 in a relatively low speed range. Representative, non-limiting low speed ranges for transmission 32 during field operations include zero to five miles per hour, and zero to ten miles per hour. Because transmission 32 is in a lower speed range, high torque requirements will be provided by traditional power assist modes.

Some field operations, however, may be performed at higher speeds, with transmission 32 engaged in one of the higher speed ranges 50, 58, or 60. In these situations, if combine 20 encounters muddy or hilly conditions, the propulsion torque requirement increases increasing the fluid pressure in the fluid loop. When the fluid pressure reaches the predetermined maximum fluid pressure, controller 40 automatically operates valve 46 in the power assist mode until the fluid pressure falls below the transition fluid pressure. Combine 20 can continue to operate with transmission 32 engaged in one of the higher speed ranges 50, 58, or 60 and receive additional propulsion torque when required without stopping to shift transmission 32 to a lower speed range.

Figure 8:
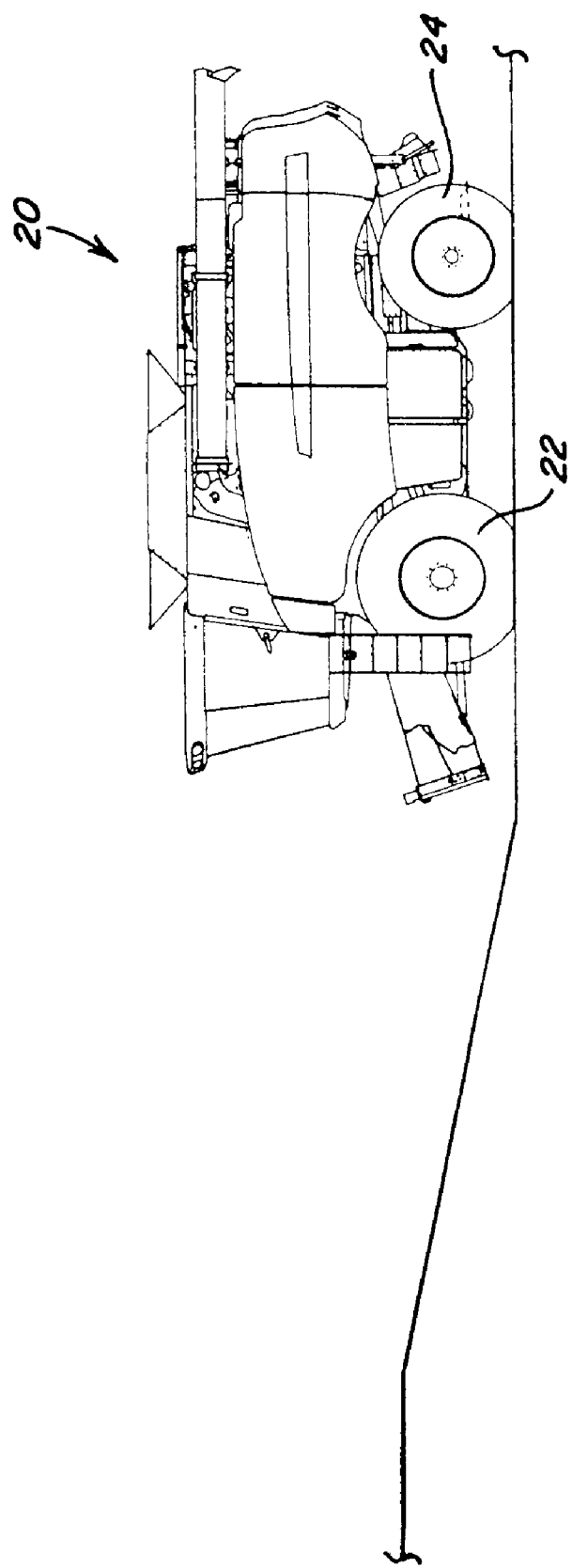
FIG. 8 is a simplified side view of the combine situated near a road.

FIG. 8 depicts combine 20 situated near a road preparing to climb out of the field to a public road, possibly in traffic. Road speeds are typically greater than ten miles per hour and are driven with transmission in a relatively high speed range. Representative, non-limiting high speed ranges for transmission 32 during road operation include zero to fifteen miles per hour and zero to twenty miles per hour.

Figure 9:
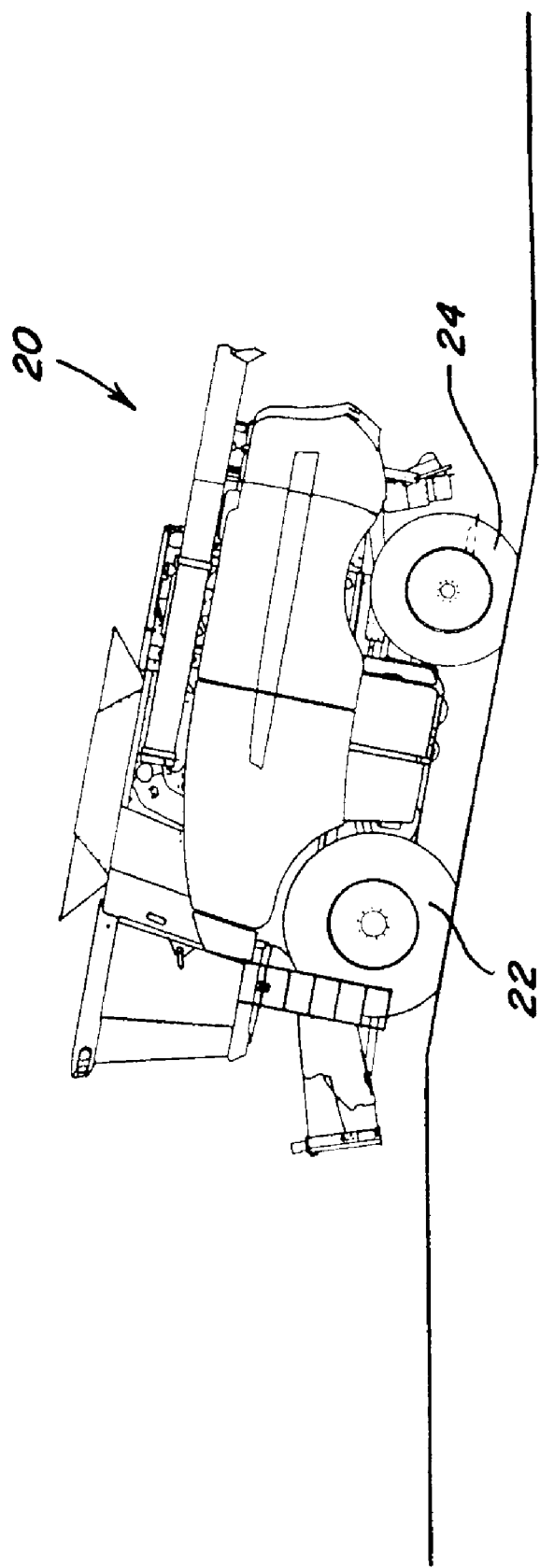
FIG. 9 is a simplified side view of the combine climbing a hill towards the road.

To pull out of the field onto the road, transmission 32 is engaged in one of the high speed ranges 50, 58, or 60, and controller 40 automatically operates valve 46 in the power assist mode. When combine 20 begins to accelerate to climb a hill to the road as shown in FIG. 9, additional propulsion torque is automatically supplied by rear wheels 24. Once combine 20 reaches the road as shown in FIG. 10 transmission 32 is already in on of the high speed ranges 50, 58, or 60, and the operator can proceed to road speeds without stopping combine 20 to shift transmission 32. Controller 40 will cease operation of valve 46 in the power assist mode or transition from low speed sub mode to high speed sub mode prior to ceasing operation of valve 46 in the power assist mode as combine 20 accelerates through transition speeds TS, T1, and T2 as shown in FIGS. 3-6. Representative, non-limiting transition speeds TS, T1, and T2 include ground speeds in the low speed ranges such as five and ten miles per hour.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A self-propelled agricultural work machine, comprising:
   a set of primary movers supporting a portion of the machine and operable for propelling the machine over the ground at a ground speed;
   a set of secondary movers supporting another portion of the machine and operable by at least one secondary fluid motor connected in driving relation thereto for driving the secondary movers for assisting the primary movers for propelling the machine;
   a mechanical transmission connected in driving relation directly to the set of primary movers, the transmission being selectably engageable in a plurality of speed ranges, including at least one road speed range for propelling the work machine between a zero ground speed and a predetermined high ground speed suitable for travel over public roads, and at least one low speed range within the road speed range for propelling the work machine between the zero ground speed and a predetermined low ground speed suitable for performing work functions in agricultural fields and slower than the predetermined high ground speed, the transmission being configured and operable for transitioning between the plurality of speed ranges only at the zero ground speed;
   a hydrostatic drive including a pump connected in a fluid loop with a primary fluid motor and operable for directing a flow of pressurized fluid through the loop at a fluid pressure to the primary fluid motor for controllably driving the primary fluid motor, the primary fluid motor being connected in driving relation to the mechanical transmission;
   a valve connected to the fluid loop and to the at least one secondary fluid motor and selectably operable in a power assist mode for diverting a portion of the flow of fluid in the loop from the primary fluid motor to the at least one secondary motor for controllably driving the at least one secondary fluid motor;
   a controller configured and operable for monitoring the speed range of the transmission, the fluid pressure in the loop, and the ground speed of the machine, the controller connected in operative control of the valve and programmed for automatically operating the valve in the power assist mode when the transmission is engaged in the at least one road speed range and the ground speed is below a predetermined transition speed less than the predetermined high ground speed.

2. The work machine of claim 1, wherein the controller is programmed for automatically operating the valve to produce gradual changes in the fluid pressure in the loop.

3. The work machine of claim 1, wherein the controller is further programmed for automatically operating the valve in the power assist mode when the mechanical transmission is engaged in the at least one road speed range and the fluid pressure exceeds a predetermined maximum fluid pressure and remains greater than a predetermined lower, transition fluid pressure.

4. The work machine of claim 1, wherein the plurality of speed ranges comprises a first speed range for propelling the machine between the zero ground speed and a predetermined first ground speed, a second speed range including the first speed range for propelling the machine between the zero ground speed and a predetermined second ground speed, a third speed range including the second speed range for propelling the machine between the zero ground speed and a predetermined third ground speed, and a fourth speed range including the third speed range for propelling the machine between the zero ground speed and a predetermined fourth ground speed, and the controller is further programmed for automatically operating the valve in the power assist mode when the mechanical transmission is engaged in the third speed range or the fourth speed range and the ground speed is below a predetermined transition speed less than the predetermined third ground speed.

5. The work machine of claim 2, wherein the power assist mode includes a first sub mode for diverting a first portion of the flow of fluid in the loop from the primary motor to the at least one secondary motor and a second sub mode for diverting a second smaller portion of the flow of fluid in the loop from the primary motor to the at least one secondary motor, and the controller is further programmed for automatically operating the valve in the first sub mode when the transmission is engaged in the at least one road speed range and the ground speed is below a predetermined first transition speed and operating the valve in the second sub mode when the transmission is engaged in the at least one road speed range and the ground speed is between the predetermined first transition speed and a predetermined second transition speed, the predetermined second transition speed being between the predetermined first transition speed and the predetermined high ground speed.

6. The work machine of claim 1, wherein the predetermined high ground speed is about twenty miles per hour, the predetermined low ground speed is between about five and ten miles per hour, and the predetermined transition speed is about five miles per hour.

7. The work machine of claim 4, wherein the predetermined first ground speed is about five miles per hour, the predetermined second ground speed is about ten miles per hour, the predetermined third ground speed is about fifteen miles per hour, the predetermined fourth ground speed is about twenty miles per hour, and the predetermined transition speed is about five miles per hour.

8. The work machine of claim 5, wherein the predetermined first transition speed is about five miles per hour, the predetermined second transition speed is about ten miles per hour and the predetermined high ground speed is about twenty miles per hour.

9. The work machine of claim 4, wherein the controller is further programmed for automatically operating the valve in the power assist mode when the mechanical transmission is engaged in the third speed range or the fourth speed range and the fluid pressure exceeds a predetermined maximum fluid pressure and remains greater than a predetermined lower, transition fluid pressure.

10. The work machine of claim 5, wherein the controller is further programmed for automatically operating the valve in the second sub mode when the transmission is engaged in the at least one road speed range and the fluid pressure exceeds a predetermined second maximum fluid pressure and remains greater than a second predetermined transition fluid pressure lower than the second maximum fluid pressure and operating the valve in the first sub mode when the transmission is engaged in the at least one road speed range and the fluid pressure exceeds a first maximum pressure higher than the second maximum pressure and remains greater than a predetermined first transition fluid pressure.

11. A self-propelled agricultural work machine, comprising:
a set of primary movers supporting a portion of the machine and operable by a primary fluid motor for propelling the machine over the ground at a ground speed;
a set of secondary movers supporting another portion of the machine and operable by at least one secondary fluid motor connected in driving relation thereto for driving the secondary movers for assisting the primary movers for propelling the machine;
a mechanical transmission connected in driven relation to the primary fluid motor and in driving relation directly to the set of primary movers, the transmission configured and operable for shifting between a plurality of speed ranges only when the machine is stationary, the plurality of speed ranges including at least one road speed range for propelling the work machine between a zero ground speed and a predetermined high ground speed suitable for travel over public roads, and at least one low speed range within the road speed range for propelling the work machine between the zero ground speed and a predetermined low ground speed slower than the predetermined high speed;
a hydrostatic drive including a pump connected in a fluid loop with the primary fluid motor and operable for directing a flow of pressurized fluid through the loop at a fluid pressure to the primary fluid motor for controllably driving the primary fluid motor;
a valve connected to the fluid loop and to the at least one secondary fluid motor and selectably operable in a power assist mode for diverting a portion of the flow of fluid in the loop from the primary fluid motor to the at least one secondary fluid motor for controllably driving the at least one secondary fluid motor;
a controller configured and operable for monitoring the speed range of the transmission, the fluid pressure in the loop, and the ground speed of the machine, the controller connected in operative control of the valve and programmed for automatically operating the valve in the power assist mode when the transmission is in the at least one road speed range and the ground speed is less than a predetermined transition speed which is less than the predetermined high ground speed.

12. The work machine of claim 11, wherein the controller is programmed for automatically operating the valve to produce gradual changes in the fluid pressure in the loop.

13. The work machine of claim 11, wherein the plurality of speed ranges comprise a first speed range for propelling the machine between the zero ground speed and a predetermined first ground speed, a second speed range including the first speed range for propelling the machine between the zero ground speed and a predetermined second ground speed, a third speed range including the second speed range for propelling the machine between the zero ground speed and a predetermined third ground speed, and a fourth speed range including the third speed range for propelling the machine between the zero ground speed and a predetermined fourth ground speed, and the controller is further programmed for automatically operating the valve in the power assist mode when the mechanical transmission is engaged in the third speed range or the fourth speed range and the ground speed is less than the predetermined transition speed which is less then the predetermined third ground speed.

14. The work machine of claim 12, wherein the power assist mode includes a first sub mode for diverting a first portion of the flow of fluid in the loop from the primary motor to the at least one secondary motor and a second sub mode for diverting a second smaller portion of the flow of fluid in the loop from the primary motor to the at least one secondary motor, and the controller is further programmed for automatically operating the valve in the first sub mode when the transmission is engaged in the at least one road speed range and the ground speed is less than a predetermined first transition speed and operating the valve in the second sub mode when the transmission is engaged in the at least one road speed range and the ground speed is between the predetermined first transition speed and a predetermined second transition speed, the predetermined second transition speed being between the predetermined first transition speed and the predetermined high ground speed.

15. The work machine of claim 11, wherein the predetermined high ground speed is about twenty miles per hour, the predetermined low ground speed is between about five and ten miles per hour, and the predetermined transition speed is about five miles per hour.

16. The work machine of claim 13, wherein the predetermined first ground speed is about five miles per hour, the predetermined second ground speed is about ten miles per hour, the predetermined third ground speed is about fifteen miles per hour, the predetermined fourth ground speed is about twenty miles per hour, and the predetermined transition speed is about five miles per hour.

17. The work machine of claim 14, wherein the predetermined first transition speed is about five miles per hour, the predetermined second transition speed is about ten miles per hour and the predetermined high ground speed is about twenty miles per hour.

18. The work machine of claim 11, wherein the controller is further programmed for automatically operating the valve in the power assist mode when the mechanical transmission is engaged in the at least one road speed range and the fluid pressure exceeds a predetermined maximum fluid pressure and remains greater than a predetermined lower, transition fluid pressure.

19. The work machine of claim 13, wherein the controller is further programmed for automatically operating the valve in the power assist mode when the mechanical transmission is engaged in the third speed range or the fourth speed range and the fluid pressure exceeds a predetermined maximum fluid pressure and remains greater than a predetermined lower, transition fluid pressure.

20. The work machine of claim 14, wherein the controller is further programmed for automatically operating the valve in the second sub mode when the transmission is engaged in the at least one road speed range and the fluid pressure exceeds a predetermined second maximum fluid pressure and remains greater than a second predetermined transition fluid pressure lower than the second maximum fluid pressure and operating the valve in the first sub mode when the transmission is engaged in the at least one road speed range and the fluid pressure exceeds a first maximum pressure higher than the second maximum pressure and remains greater than a predetermined first transition fluid pressure.

* * * * *